United States Patent
Nowak et al.

(10) Patent No.: US 12,524,294 B2
(45) Date of Patent: *Jan. 13, 2026

(54) REMEDIATION ACTION SYSTEM

(71) Applicant: Capital One Services, LLC, McLean, VA (US)

(72) Inventors: Matthew Louis Nowak, Midlothian, VA (US); Keith D. Greene, Mechanicsville, VA (US); Catherine Barnes, Glen Allen, VA (US); David Walter Peters, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,077

(22) Filed: Sep. 5, 2023

(65) Prior Publication Data
US 2023/0409424 A1 Dec. 21, 2023

Related U.S. Application Data

(63) Continuation of application No. 17/509,483, filed on Oct. 25, 2021, now Pat. No. 11,782,784.

(51) Int. Cl.
*G06F 11/07* (2006.01)
*G06F 16/28* (2019.01)
(Continued)

(52) U.S. Cl.
CPC ...... *G06F 11/0793* (2013.01); *G06F 11/0787* (2013.01); *G06F 16/288* (2019.01); *G06F 18/22* (2023.01); *G06N 20/00* (2019.01)

(58) Field of Classification Search
CPC ............ G06F 11/0793; G06F 11/0787; G06F 16/288; G06F 18/22; G06N 20/00
(Continued)

(56) References Cited

U.S. PATENT DOCUMENTS

| | | | |
|---|---|---|---|
| 8,751,421 | B2 | 6/2014 | Anderson et al. |
| 10,375,098 | B2 | 8/2019 | Oliner et al. |

(Continued)

FOREIGN PATENT DOCUMENTS

CA     2947936 A1    11/2014

OTHER PUBLICATIONS

Wikipedia string metric page, retrieved from https://en.wikipedia.org/wiki/String_metric (Year: 2024).*

(Continued)

*Primary Examiner* — Yair Leibovich
(74) *Attorney, Agent, or Firm* — Banner & Witcoff, Ltd.

(57) ABSTRACT

Aspects described herein may use machine learning models to predict one or more remediation actions to mitigate reoccurrence of an incident that has become restored based upon previous incidents of an entity. Historical incident data is compiled into two incident datasets: one representative of incidents that were assigned a remediation action to mitigate reoccurrence of the incident, and a second representative of incidents that were not assigned a remediation action. A machine learning model matches relationships between data in the two datasets and outputs scores representative of similarities. Based on the scores, one or more remediation actions are mapped to an incident in the second dataset and the remediation action is performed for the incident.

20 Claims, 6 Drawing Sheets

(51) Int. Cl.
*G06F 18/22* (2023.01)
*G06N 20/00* (2019.01)

(58) Field of Classification Search
USPC .......................................................... 714/2
See application file for complete search history.

(56) References Cited

U.S. PATENT DOCUMENTS

| | | |
|---|---|---|
| 12,169,794 B1 | 12/2024 | Goodwin et al. |
| 2004/0153823 A1* | 8/2004 | Ansari ................ G06F 11/0793 714/38.14 |
| 2014/0180738 A1 | 6/2014 | Phillipps et al. |
| 2016/0330219 A1 | 11/2016 | Hasan |
| 2019/0095821 A1 | 3/2019 | Pourmohammad |
| 2019/0130310 A1 | 5/2019 | Madhava Rao et al. |
| 2019/0180172 A1 | 6/2019 | Baughman et al. |
| 2019/0213509 A1 | 7/2019 | Burleson et al. |
| 2019/0378073 A1 | 12/2019 | Lopez et al. |
| 2020/0026632 A1* | 1/2020 | Brinkmann ......... G06F 11/0766 |
| 2020/0104401 A1 | 4/2020 | Burnett et al. |
| 2020/0293946 A1 | 9/2020 | Sachan et al. |
| 2020/0322361 A1 | 10/2020 | Ravindra et al. |
| 2021/0075814 A1 | 3/2021 | Bulut et al. |
| 2022/0343081 A1 | 10/2022 | Gnanasambandam et al. |
| 2023/0061264 A1 | 3/2023 | Mohanty et al. |

OTHER PUBLICATIONS

Wikipedia "machine learning" page, retrieved from https://en.wikipedia.org/wiki/Machine_learning (Year: 2024).*

Wikipedia "search string algorithm" page, retrieved from https://en.wikipedia.org/wiki/String-searching_algorithm (Year: 2025).*

\* cited by examiner

REMEDIATION ACTION SYSTEM

CROSS REFERENCE TO RELATED APPLICATIONS

This is a continuation application of U.S. application Ser. No. 17/509,483, filed Oct. 25, 2021, the disclosure of which is herein incorporated by reference in its entirety.

FIELD OF USE

Aspects of the disclosure relate generally to identifying and performing at least one remediation action to mitigate the reoccurrence of a previous incident of an entity. More specifically, aspects of the disclosure provide techniques for using a machine learning model to match relationships between data in two datasets of historical incident data and to output scores representative of similarities between incidents with remediation actions and incidents without remediation actions in order to assign remediation actions to those incidents without remediation actions.

BACKGROUND

Operational efficiency often is sought by entities. Many entities want their business to operate with as few incidents that require some form of mitigation to address. For example, cybersecurity is a sector of an entity's business that has increased substantially in recent years. Attacks from hackers and other nefarious individuals are a constant siege for an entity on a daily basis. Coupled with that are power outages, equipment failures, human errors, and other types of incidents that an entity must manage constantly. Yet when new incidents occur for an entity, conventional systems for mitigating the occurrence are slow and hampered by wasted time and resources.

Figure 1:
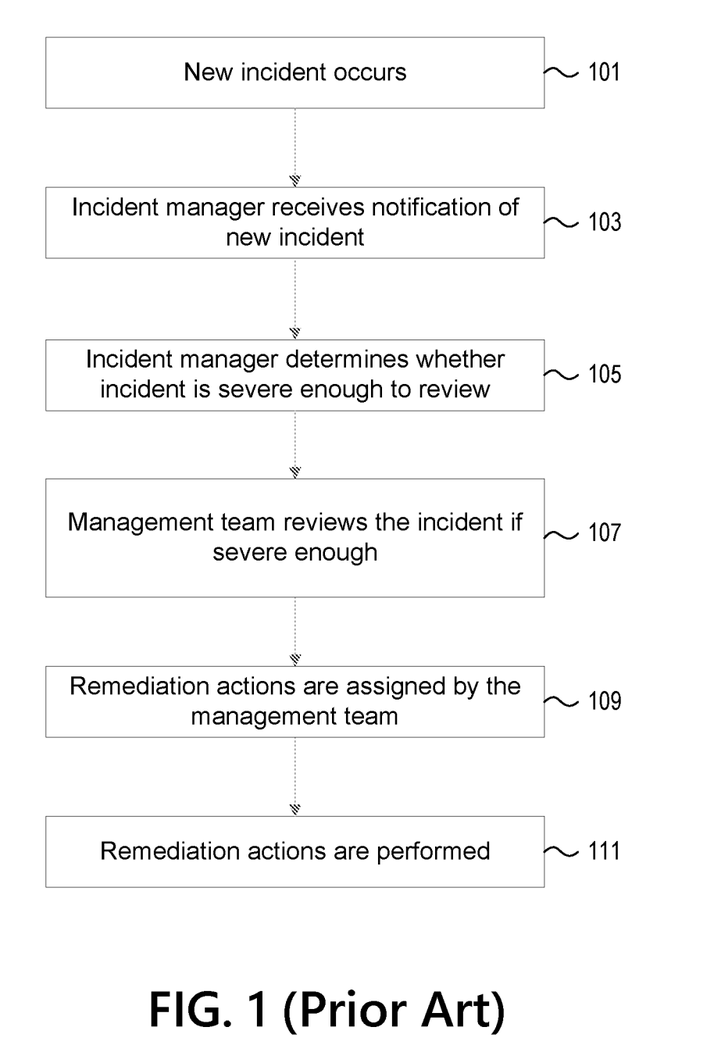
FIG. 1 depicts an example of conventional manner in which a new incident at an entity is addressed.

FIG. 1 depicts an example of conventional manner in which a new incident at an entity is addressed. At step 101, a new incident occurs. For example, a fire at a facility that maintains operational backup data servers for an entity may occur. In response to the occurrence of the incident, some likely form of action occurs. In step 103, an incident manager receives notification of the new incident. The incident manager may be someone within the entity that is assigned to address new incidents when they are identified but also may not be someone that directly mitigates the occurrence of the new incident.

In step 105, the incident manager determines whether the new incident is severe enough to review for implementing protocols or other procedures to reoccurrence of the incident. For example, in the case of the operational backup data servers for a facility where a fire occurred, the operational backup servers may be maintaining operational data that is not critical for any day-to-day functions of the entity and/or may simply maintain certain historical data that does not affect operation of the entity immediately. In such a case, the incident manager may determine that the severity level of the new incident does not satisfy a threshold to take more immediate action to mitigate reoccurrence of the incident in the future. Alternatively, the incident manager may determine that the new incident is a severe enough incident that it satisfies a threshold for a management team to review the incident, including the circumstances of the cause of the new incident and the affect taken on the entity. Such may be the case when the new incident concerns operational backup servers for ensuring a website of the entity is operational in case the primary operational servers for operation of the website go offline for any reason.

In step 107, a management team reviews the new incident if the severity level satisfies a threshold for review purposes. Such a management team may be comprised of individuals of the entity, including potentially other parties, such as a contractor or vendor, that are tasked with reviewing the new incident and the circumstances that led to the new incident. In the case of a fire at a facility of the entity, the management team may include a fire marshal for the facility, a facility manager for the facility, and potentially even a state or local member of the fire department. This management team discussion happens after the effect of the incident has been restored and is often called a post mortem or post incident review.

Following the discussion by the management team, in step 109, one or more remediation actions may be assigned by the management team. These remediation actions are assigned to help make sure that the issues that caused the new incident to occur do not occur again or are at least less likely to occur again. Example remediation actions may include adding new monitors, removing monitors, altering autoscaling groups, updating resiliency procedures, and updating fire retardant systems. Thereafter, in step 11, the assigned remediation actions may be performed. One or more individuals responsible for the entity resources affected by the new incident perform the remediation actions.

Aspects described herein may address these and other problems, and generally enable predicting similarities, in historical incident data, of incidents that were reviewed and had remediation actions assigned to them to incidents that were not reviewed, for example, incidents that did not meet the severity threshold to warrant a review by a management team. Such a prediction thereby reduces the likelihood of a reoccurrence of an incident that does not warrant a review since its severity level failed to satisfy a threshold and reduces the time and resources spent in mitigating the reoccurrence of an incident as quickly or efficiently as possible.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for the prediction and assignment of one or more remediation actions to mitigate the reoccurrence of an incident of an entity that has occurred and after the issue has been restored. This may have the effect of significantly improving the ability of entities to ensure expedited mitigation of reoccurrence of an incident affecting the entity, ensure individuals likely to be suited for a discussion on mitigating an incident are spending their time reviewing incidents that are new types of incidents, automatically predict similarities of previous incidents that have been reviewed with previous incidents that were not reviewed, and improve incident management experiences for future incidents. According to some aspects, these and other benefits may be achieved by taking previous incident data and identification of remediation actions assigned to mitigated reoccurrence of such incidents, compiling such data, and utilizing it with machine learning models trained to recognize relationships between such previous data that were reviewed and not reviewed and to predict the remediation actions to assign to mitigate reoccurrence of previous incidents that were not reviewed. Such a prediction then may be used to schedule automatically the assigned individuals to a conference call or discussion group to mitigate the new incident as quickly and/or efficiently as possible.

Aspects discussed herein may provide a computer-implemented method for predicting and assigning one or more remediation actions to mitigate the reoccurrence of an incident of an entity that has occurred and after the issue has been restored. For example, in at least one implementation, a computing device may compile historical incident data maintained in a database. The historical incident data may represent data of assets of an entity previously involved in one or more incidents. The historical incident data may be compiled into two incident datasets. A first incident dataset may be representative of the one or more incidents that were assigned at least one remediation action. A remediation action may have been assigned to mitigate reoccurrence of the corresponding incident. A second incident dataset may be representative of the one or more incidents that were not assigned at least one remediation action.

The computing device may input the second incident dataset into a machine learning model. The machine learning model may be trained to semantically match one or more first descriptions of the one or more incidents in the first incident dataset with a second description of a first incident in the second incident dataset. The machine learning model further may be trained, for each of the one or more first descriptions, to output a score representative of a similarity of the first description and the second description. The computing device may map, based on the scores, one of the at least one remediation action to the first incident. The computing device may provide the mapped one of the at least one remediation action, and, in some cases, may perform the one of the at least one remediation action to mitigate the first incident.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for identifying and performing at least one remediation action to mitigate the reoccurrence of a previous incident of an entity where the previous incident was not reviewed by a management team. The previous incident may have occurred for an entity. For example, an outage may occur at a facility that maintains servers that are accessible by customers as part of an application on a mobile device. Illustrative example applications include applications for ordering groceries, for checking financial data, for uploading photos as part of a social media application, and/or other uses. Upon implementation, the present disclosure describes receiving historical incident data maintained in a database. The historical incident data may represent data of assets of an entity previously involved in one or more incidents. The historical incident data may be compiled into multiple datasets. A first incident dataset may represent the one or more incidents that were assigned at least one remediation action, where each remediation action was assigned to mitigate reoccurrence of the corresponding incident. A second incident dataset may represent the one or more incidents that were not assigned at least one remediation action. The second incident dataset may be inputted into a first machine learning model trained to semantically match one or more first descriptions of the one or more incidents in the first incident dataset with a second description of a first incident in the second incident dataset. The first machine learning model may be trained to semantically match the one or more first descriptions with the second description by utilizing at least one text similarity algorithm.

The first machine learning model further may be trained, for each of the one or more first descriptions, to output a score representative of a similarity of the first description and the second description. Each score may be compared to a threshold value. Based on a first score satisfying the threshold value, a determination may be made to map the one of the at least one remediation action to the first incident. Based on the scores, one of the at least one remediation action may be mapped to the first incident. The mapping may include ranking the mapped remediation actions by the scores. The mapped one of the at least one remediation action may be provided. A determination may be made as to whether the mapped one of the at least one remediation action is assigned to the first incident. A user input representative of a confirmation of assigning the mapped one of the at least one remediation action to the first incident may be received. In the database, a new database entry comprising the one of the at least one remediation action and the first incident may be created.

After the mapping, a determination may be made as to whether a new remediation action is assigned to the first incident. A user input representative of a confirmation of assigning the new remediation action to the first incident may be received. The one of the at least one remediation action to mitigate the first incident may be performed. Data of the first incident may be added into the first incident dataset, and data of the first incident may be removed from the second incident dataset.

Aspects described herein improve the functioning of computers by improving the ability of computing devices to identify and predict remediation actions to assign to incidents for mitigating reoccurrence of the incident. Conventional systems are susceptible to failure or repetition of reoccurrence of a previous incident—for example, an incident that may reoccur similarly for another entity resource under a similar situation as an incident that had remediation actions assigned to mitigate reoccurrence of that incident may lead to wasted time and resources to address the reoccurrence of an incident. As such, these conventional techniques leave entities exposed to the possibility of a constant reoccurrence of the incident on the operation of the entity. By providing improved assignment techniques—for example, based on predicting the likely remediation actions to assign, based upon previous incidents, previous assignments, and incident severity determinations, to mitigate reoccurrence of an incident—a proper remediation action assignment can be more accurately determined. Over time, the processes described herein can save processing time, network bandwidth, and other computing resources. Moreover, such improvement cannot be performed by a human being with the level of accuracy obtainable by computer-implemented techniques to ensure accurate prediction of the remediation actions.

Before discussing these concepts in greater detail, however, several examples of a computing device and environment that may be used in implementing and/or otherwise providing various aspects of the disclosure will first be discussed with respect to FIG. 2.

Figure 2:
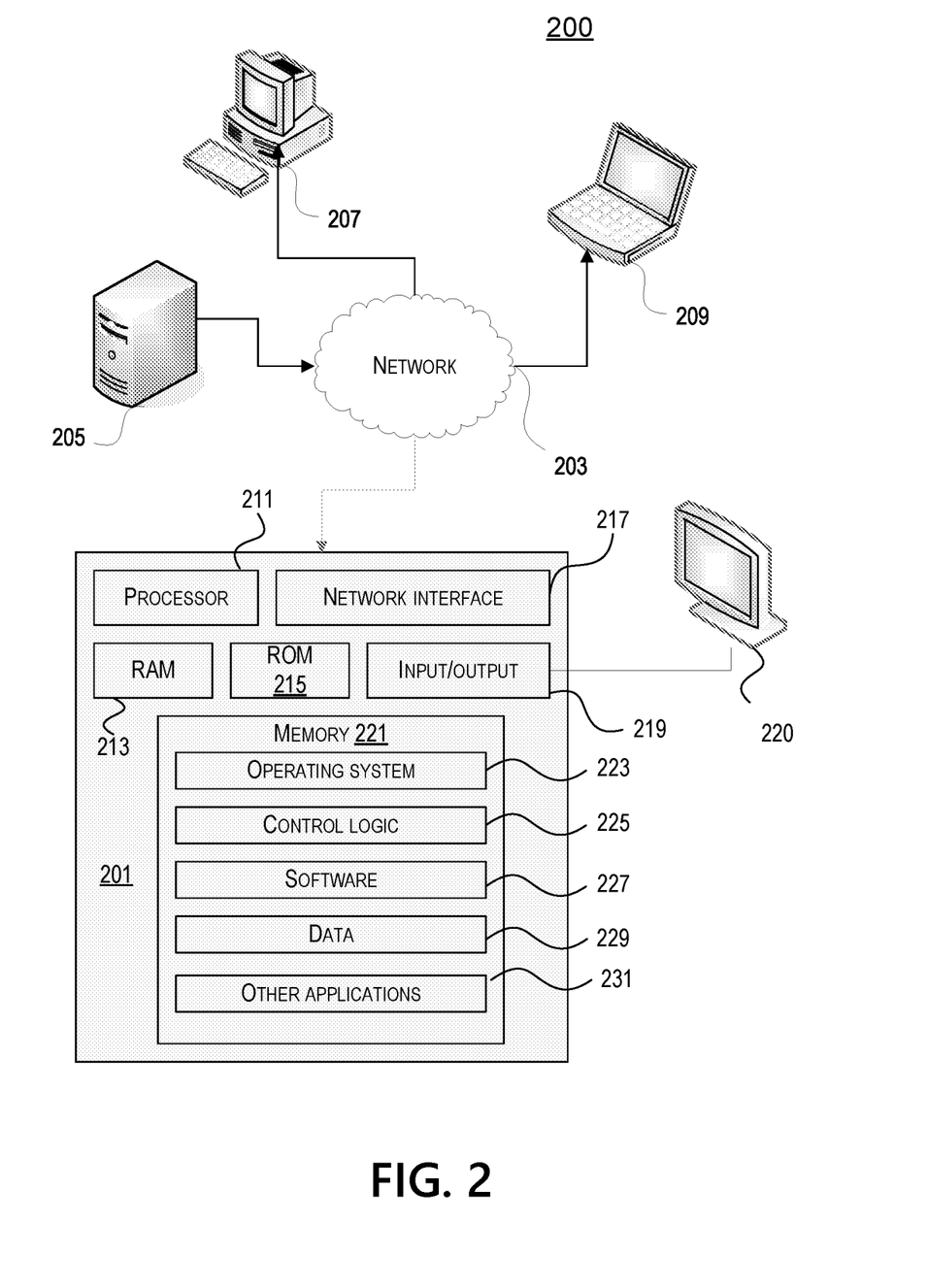
FIG. 2 depicts an example of a computing environment that may be used in implementing one or more aspects of the disclosure in accordance with one or more illustrative aspects discussed herein.

FIG. 2 illustrates one example of a computing environment 200 and computing device 201 that may be used to implement one or more illustrative aspects discussed herein. For example, computing device 201 may, in some embodiments, implement one or more aspects of the disclosure by reading and/or executing instructions and performing one or more actions based on the instructions. In some embodiments, computing device 201 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 201 may, in some embodiments, operate in a standalone environment. In others, computing device 201 may operate in a networked environment, including network 203 or network 381 in FIG. 3. As shown in FIG. 2, various network nodes 201, 205, 207, and 209 may be interconnected via a network 203, such as the Internet. Other networks may also or alternatively be used, including private intranets, corporate networks, local area networks (LANs), wireless networks, personal networks (PAN), and the like. Network 203 is for illustration purposes and may be replaced with fewer or additional computer networks. A LAN may have one or more of any known LAN topologies and may use one or more of a variety of different protocols, such as Ethernet. Devices 201, 205, 207, 209 and other devices (not shown) may be connected to one or more of the networks via twisted pair wires, coaxial cable, fiber optics, radio waves, or other communication media.

As seen in FIG. 2, computing device 201 may include a processor 211, RAM 213, ROM 215, network interface 217, input/output (I/O) interfaces 219 (e.g., keyboard, mouse, display, printer, etc.), and memory 221. Processor 211 may include one or more central processing units (CPUs), graphical processing units (GPUs), and/or other processing units such as a processor adapted to perform computations associated with machine learning. Processor 211 may control an overall operation of the computing device 201 and its associated components, including RAM 213, ROM 215, network interface 217, I/O interfaces 219, and/or memory 221. Processor 211 can include a single central processing unit (CPU) (and/or graphic processing unit (GPU)), which can include a single-core or multi-core processor along with multiple processors. Processor(s) 211 and associated components can allow the computing device 201 to execute a series of computer-readable instructions to perform some or all of the processes described herein. A data bus can interconnect processor(s) 211, RAM 213, ROM 215, memory 221, I/O interfaces 219, and/or network interface 217.

I/O interfaces 219 may include a variety of interface units and drives for reading, writing, displaying, and/or printing data or files. I/O interfaces 219 may be coupled with a display such as display 220. I/O interfaces 219 can include a microphone, keypad, touch screen, and/or stylus through which a user of the computing device 201 can provide input, and can also include one or more of a speaker for providing audio output and a video display device for providing textual, audiovisual, and/or graphical output.

Network interface 217 can include one or more transceivers, digital signal processors, and/or additional circuitry and software for communicating via any network, wired or wireless, using any protocol as described herein. It will be appreciated that the network connections shown are illustrative and any means of establishing a communications link between the computers or other devices can be used. The existence of any of various network protocols such as TCP/IP, Ethernet, FTP, Hypertext Transfer Protocol (HTTP) and the like, and various wireless communication technologies such as Global system for Mobile Communication (GSM), Code-division multiple access (CDMA), WiFi, and Long-Term Evolution (LTE), is presumed, and the various computing devices described herein can be configured to communicate using any of these network protocols or technologies.

Memory 221 may store software for configuring computing device 201 into a special purpose computing device in order to perform one or more of the various functions discussed herein. Memory 221 may store operating system software 223 for controlling overall operation of computing device 201, control logic 225 for instructing computing device 201 to perform aspects discussed herein, software 227, data 229, and other applications 231. Control logic 225 may be incorporated in and may be a part of software 227. In other embodiments, computing device 201 may include two or more of any and/or all of these components (e.g., two or more processors, two or more memories, etc.) and/or other components and/or subsystems not illustrated here.

Devices 205, 207, 209 may have similar or different architecture as described with respect to computing device 201. Those of skill in the art will appreciate that the functionality of computing device 201 (or device 205, 207, 209) as described herein may be spread across multiple data processing devices, for example, to distribute processing load across multiple computers, to segregate transactions based on geographic location, user access level, quality of service (QoS), etc. For example, devices 201, 205, 207, 209, and others may operate in concert to provide parallel computing features in support of the operation of control logic 225 and/or software 227.

Although not shown in FIG. 2, various elements within memory 221 or other components in computing device 201, can include one or more caches including, but not limited to, CPU caches used by the processor 211, page caches used by an operating system, disk caches of a hard drive, and/or database caches used to cache content from a data store. For embodiments including a CPU cache, the CPU cache can be used by one or more processors 211 to reduce memory latency and access time. Processor 211 can retrieve data from or write data to the CPU cache rather than reading/writing to memory 221, which can improve the speed of these operations. In some examples, a database cache can be created in which certain data from a data store is cached in a separate smaller database in a memory separate from the data store, such as in RAM 215 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although various components of computing device 201 are described separately, functionality of the various components can be combined and/or performed by a single component and/or multiple computing devices in communication without departing from the invention. Having discussed several examples of computing devices which may be used to implement some aspects as discussed further below, discussion will now turn to various examples for assigning one or more remediation actions to mitigate the reoccurrence of an incident of an entity.

Figure 3:
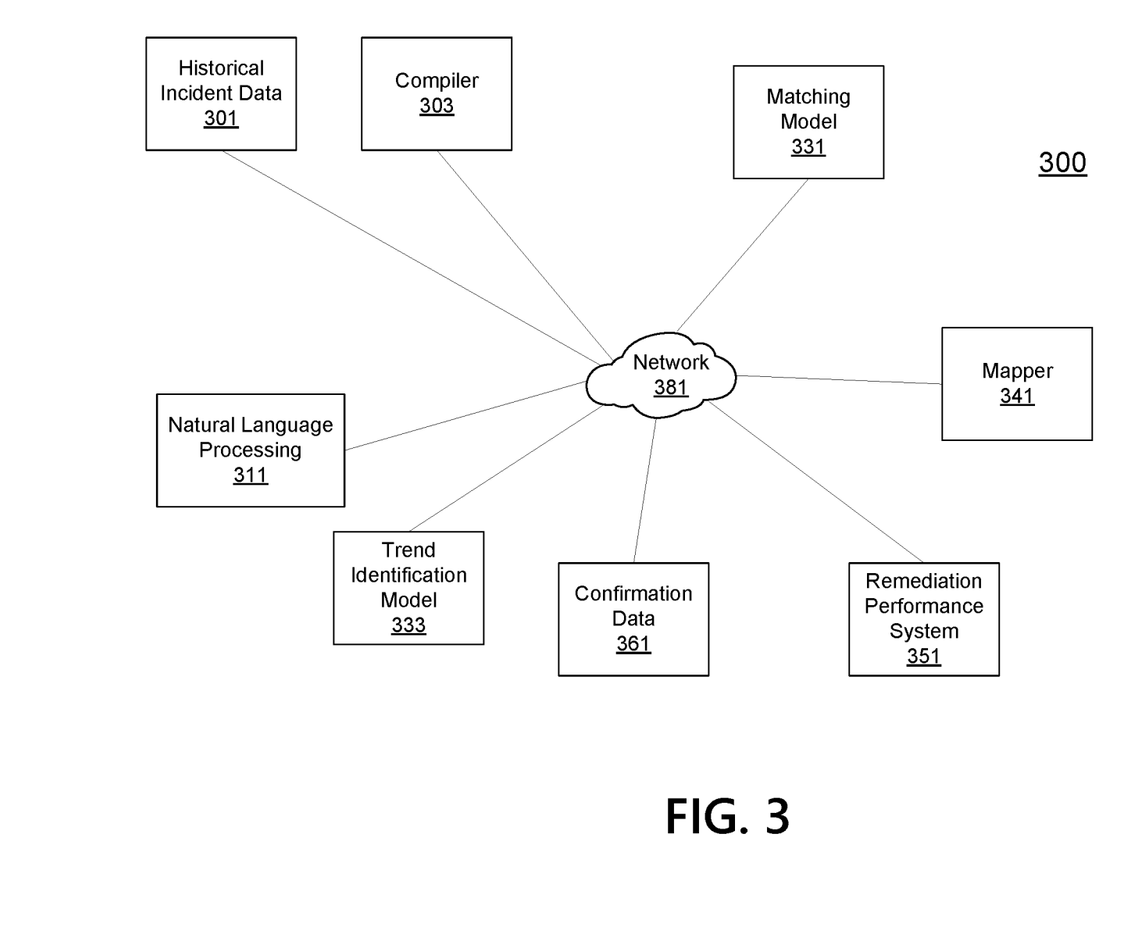
FIG. 3 illustrates a system for assigning one or more remediation actions to mitigate the reoccurrence of a previous incident of an entity in accordance with one or more aspects described herein.

FIG. 3 illustrates a system 300 for assigning one or more remediation actions to mitigate the reoccurrence of a previous incident of an entity. The operating environment 300 may include computing devices 303, 311, 331, 333, and 341, memories or databases 301 and 361, and a remediation performance system 351 in communication via a network 381. Network 381 may be network 203 in FIG. 2. It will be appreciated that the network 381 connections shown are illustrative and any means of establishing a communications link between the computing devices, remediation performance system, and memories or databases may be used. The existence of any of various network protocols such as Transmission Control Protocol/Internet Protocol (TCP/IP), Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices and/or network described with respect to FIG. 2.

As shown in FIG. 3, the system 300 may include one or more memories or databases that maintains historical incident data 301. A computing device utilizing natural language processing 311 may be configured to access the one or more memories or databases that maintains historical incident data 301. The historical incident data 301 may include data representative of one or more past incidents of the entity. The historical incident data 301 may be historical data of previous incidents, including causes of an incident, start time of an incident, end time of an incident, time periods of an incident, assets of the entity effected by an incident, locations where an incident occurred, a severity of an incident in effecting some operation or function of the entity, and/or data regarding successful steps taken and failures in mitigating an incident. The historical incident data 301 also may include one or more remediation actions that was assigned to mitigate reoccurrence of a corresponding past incident. The remediation action data also may include new protocols and/or procedures implemented in response to the corresponding incident and/or new equipment used in conjunction with or as a back up to, assets involved in the previous incident. Any specific action that may have been used to mitigate the reoccurrence of a previous incident is an example remediation action.

System 300 may include one or more computing devices as a compiler 303 for compiling the historical data into a plurality of datasets. Compiler 303 compiles the historical incident data into a first incident dataset, which may be representative of the one or more incidents that were assigned at least one remediation action. These would be incidents in which a management team reviewed the circumstances of an incident and then assigned one or more remediation actions to mitigate reoccurrence of the incident. Compiler 303 further compiles the historical incident data into a second incident dataset, which may be representative of the one or more incidents that were not reviewed by a management team and not assigned at least one remediation action.

System 300 may include one or more computing devices utilizing natural language processing 311. The one or more computing devices utilizing natural language processing 311 may receive data and/or access data from one or more of memories or databases 301 and 361. Natural language processing 311 may be utilized in order to account for textual and/or other data entries that do not consistently identify the same or similar data in the same way. The natural language processing 311 may be utilized to identify text in data of various types and in various formats. The two datasets may be used thereafter as input data to one or more machine learning models 331 and 333.

System 300 may include one or more computing devices implementing a first machine learning matching model 331. First machine learning matching model 331 may be trained to recognize one or more relationships between the two datasets. Specifically, the first machine learning matching model 331 may semantically match one or more first descriptions of the one or more incidents in the first incident dataset with a second description of a first incident in the second incident dataset. In some embodiments, the first machine learning matching model 331 may be trained to semantically match the one or more first descriptions with the second description by utilizing at least one text similarity algorithm. The text similarity algorithm may be part of the natural language processing 311 where a description of a particular incident in the first dataset is a text entry describing a cause of the particular incident. A description of a particular incident in the second dataset may be a text entry describing a cause of that particular incident. However, the two text entries may be representative of the same cause but merely having different text to explain it. For example, an incident in the first dataset may be a server failure and a description of this incident may be a description of the cause being identified in text as "fan failure." An incident in the second dataset may have a description of the incident as a cause of the incident being identified in text as "broken fan." In this example, the first machine learning matching model 331 may semantically match the first description "fan failure" of an incident in the first incident dataset with the second description "broken fan" of an incident in the second incident dataset.

For each of the one or more first descriptions, first machine learning matching model 331 may be trained to output a score representative of a similarity of the first description and the second description. A score may be a numerical value associated with a designated scale with a higher value corresponding to higher similarity determination for the two descriptions. In some embodiments, each score may be compared to a threshold value. The threshold value may be a score requirement for taking some additional action to map remediation actions associated with the first description to the incident associated with the second description. When a score satisfies the threshold value, the remediation action may be mapped to the incident in the second dataset.

System 300 also may include one or more computing devices implementing a second machine learning trend identification model 333. Second machine learning trend identification model 333 may be trained to classify each remediation action of the first incident dataset to one of a plurality of categories. Examples of categories for classification purposes include add/update alerting/monitoring, move to target architecture, update runbook/playbook, augment testing/validation, correct deployment process, correct production issue, optimize network configuration, optimize communication, optimize vendor interaction, validate process, improve failover capability, optimize capacity, increase automation, optimize batch process, hygiene/housekeeping, update process documentation, and validate environment. The second machine learning trend identification model 333 further may be trained to recognize trends among the categories. For example, a trend may be recognized that one or more categories of remediation actions occur at a certain time of day, at a certain time of year, within a certain environmental condition, such as a warmer environment, or within a certain regional area. In some embodiments, multiple trends may be recognized. The second machine learning trend identification model 333 may be trained to recognize the trends by identifying a ratio between classified remediation actions and a first category of the plurality of categories. The second machine learning trend identification model 333 further may be trained to recognize the trends by identifying whether a first category of the plurality of categories includes more classified remediation actions than a second category of the plurality of categories. In some embodiments, the second machine learning trend identification model 333 may be trained to recognize the trends by identifying whether a first category of the plurality of categories includes more classified remediation actions than each of the other of the plurality of categories based upon a time of year.

System 300 may include one or more computing devices as a mapper 341 for mapping, based on scores, one or more remediation actions to the incident in the second dataset. Mapper 341 may be configured to use the scores, for each of the descriptions for incidents within the first dataset, to map the remediation action for the highest scored description or a plurality of remediation actions for a corresponding plurality of highest scored descriptions. Such a mapping may include ranking the mapped remediation actions by the scores.

System 300 includes a remediation performance system 351 configured to perform any assigned remediation actions to mitigate the reoccurrence of the incident in the second dataset. The assigned remediation actions may be the remediation actions mapped based upon scores by mapper 341. As part of remediation performance system 351, in some embodiments, the assigned remediation actions may be based on determining whether the remediation actions mapped by mapper 341 is confirmed assigned by an individual. An individual may accept or reject mapped remediation actions and the remediation performance system 351 may perform the assigned remediation actions that are remediation actions that were mapped and accepted. In other embodiments, one or more individuals may perform one or more of the assigned remediation actions.

System 300 also includes confirmation data 361. Confirmation data 361 may include receiving user input that is representative of a confirmation of assigning, to the incident, one or more mapped remediation actions. System 300 may be configured to be completely autonomous where mapped remediation actions are automatically assigned. Alternatively, system 300 may be configured to require a confirmation by a user prior to assigning one or more of the mapped remediation actions to the incident. The user may confirm all, some, or none of the remediation actions that the system has mapped. In some occurrences, the user may identify additional and/or different remediation actions to assign to the incident. This user confirmation and/or user override of remediation action assignment may be feedback data to historical incident data 301. Data maintained in the historical incident data 301 and utilized by the machine learning models 331 and 333 described herein may be updated to account for the confirmation data 361. Such an update may include creating, in the database maintaining historical incident data, a new database entry comprising the assigned remediation actions and the incident in the second dataset. Data of the incident may be added into the first incident dataset and removed from the second incident dataset.

Figure 4A:
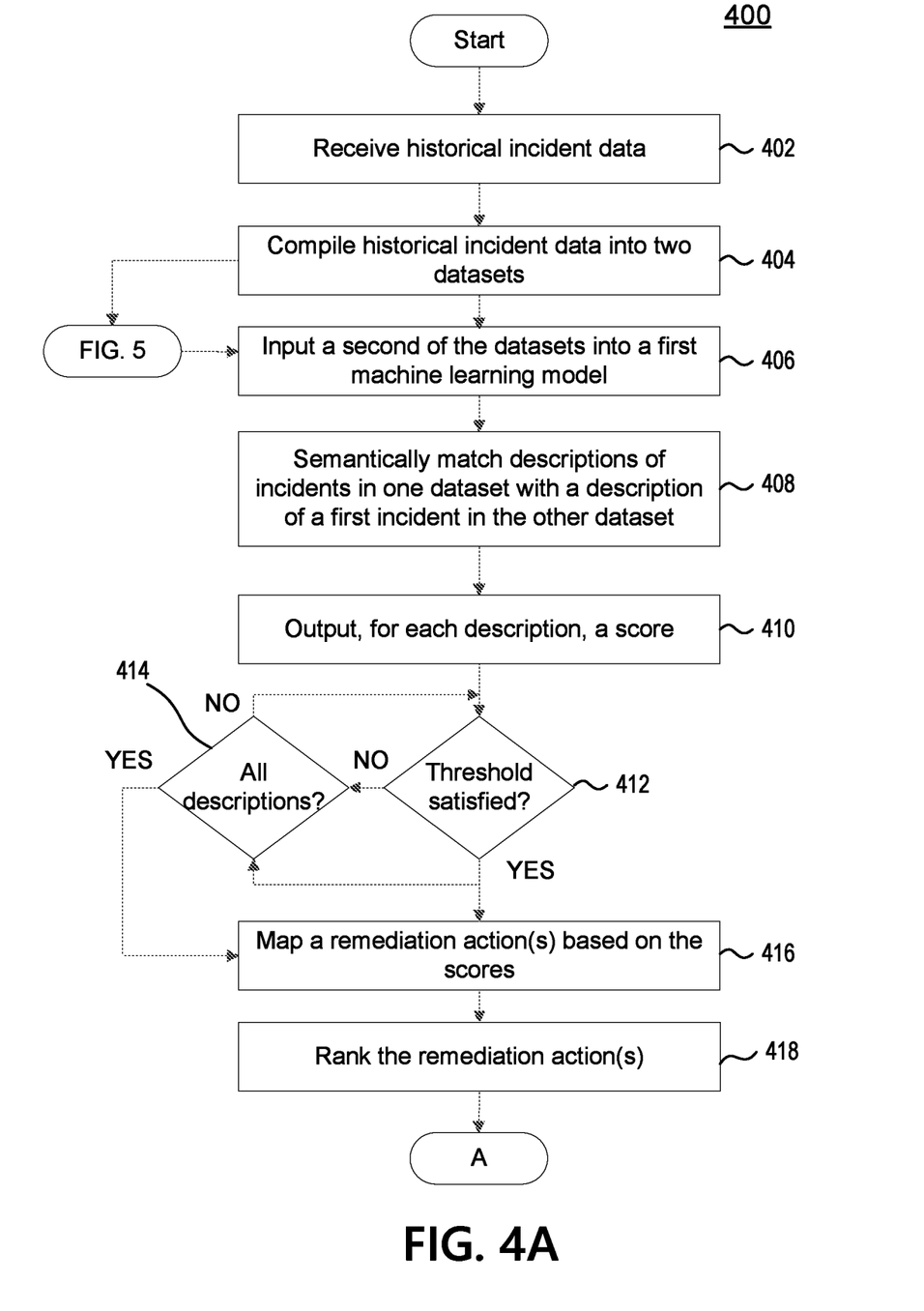
FIGS. 4A-4B depict a flowchart for a method for assigning one or more remediation actions to mitigate the reoccurrence of a previous incident of an entity in accordance with one or more aspects described herein.
Figure 4B:
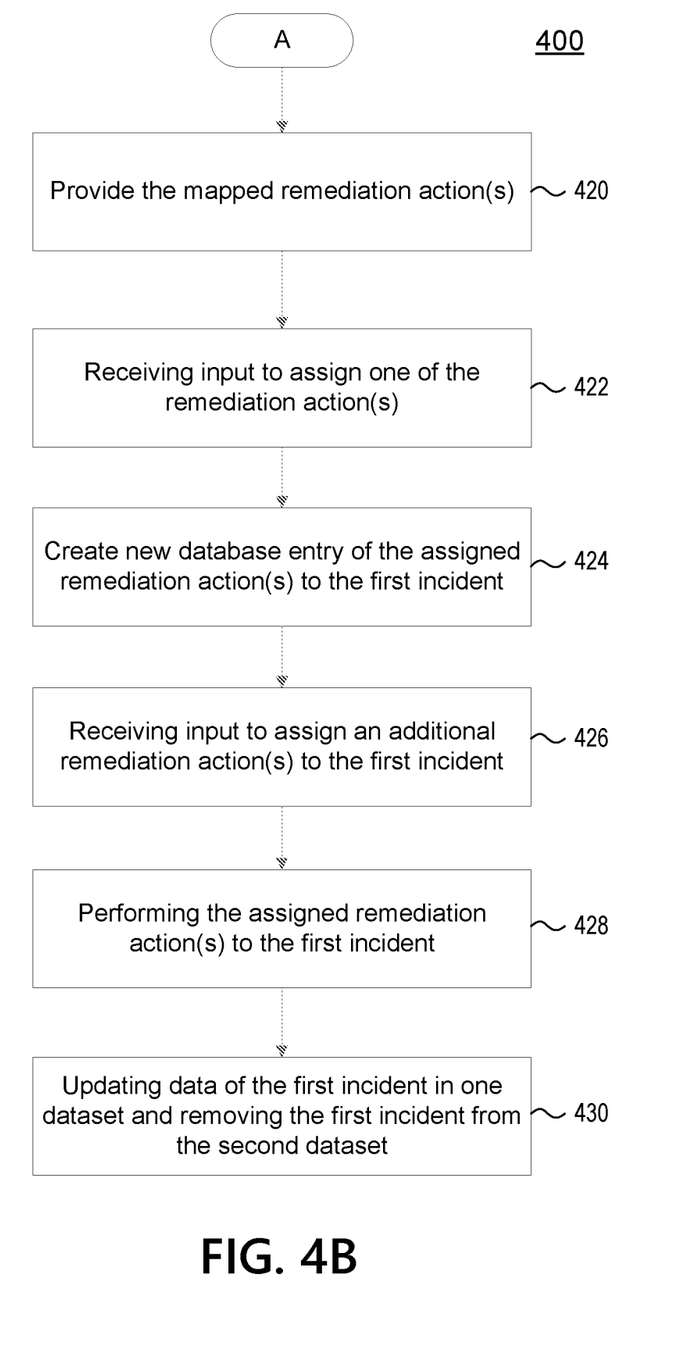

FIGS. 4A-4B depict a flowchart for a method for assigning one or more remediation actions to mitigate the reoccurrence of a previous incident of an entity. Some or all of the steps of method 400 may be performed using a system that comprises one or more computing devices as described herein, including, for example, computing device 201, or computing devices in FIG. 2, and computing devices in FIG. 3.

At step 402, one or more computing devices may receive historical incident data. Historical incident data may be maintained in a memory of a computing device and/or as part of a database or other memory location accessible by a computing device. The historical incident data may include data representative of one or more past incidents of the entity. As such, an entity may maintain historical data of previous incidents, including causes, times, assets effected, locations, severity of the incident in effecting some operation or function of the entity, and/or successes and failures in mitigating the reoccurrences of the incidents. The historical incident data may include remediation actions that were assigned to mitigate reoccurrence of a corresponding past incident. In the example of a previous incident in which a fire at a facility occurred, a remediation action may have been to place equipment in a fire retardant location and/or to implement a fire extinguishing system in a room housing such equipment. The remediation action data also may include new protocols and procedures implemented in response to the corresponding incident and/or new equipment used in conjunction with or as a back up to, assets involved in the previous incident. Any specific action that may have been used to mitigate the reoccurrence of a previous incident is an example remediation action. Historical incident data further may include data representative of assets of an entity. The assets of the entity may have been involved in one or more incidents in which mitigation of the incident was needed. Illustrative examples of an incident include the destruction of entity equipment, a cybersecurity attack on equipment of an entity, a power outage effecting equipment of an entity, and data corruption associated with equipment of an entity. The historical incident data also may include data representative of associations between the assets of the entity. For example, two assets (e.g., pieces of equipment) may both be maintained within a certain building of the entity. Thus, a fire at the certain building may affect both assets. Two or more assets also may be associated with each other as they provide data to and/or receive data from the other assets. For example, an application on a mobile device may access a user authentication server to ensure a user has access rights to certain data and the application may separately access a database that maintains content desired by the user. Accordingly, there may be an association established between the application and the authentication server and between the application and the database and/or between the application, the authentication server, and the database.

At step 404, one or more computing devices may compile the historical incident data into various datasets for use as input data to one or more machine learning models. As part of the process of compiling the various data, natural language processing may be utilized in order to account for textual and other data entries that do not consistently identify the same or similar data in the same way. The natural language processing may be utilized to identify text in data of various types and in various formats. The identified text may be grouped with similarly identified text into various fields for eventual use in a machine learning model. The compiled datasets may be maintained in a memory as needed for use in one or more machine learning models. The various fields of data may include time series data, incident cause data, device impact data, scoring data, remediation action data, and user confirmation data as described herein. Historical incident data may be maintained in a memory of a computing device and/or as part of a database or other memory location accessible by a computing device. As part of step 404, the historical incident data may be compiled into two datasets. A first incident dataset may include data representative of one or more incidents that were assigned at least one remediation action. These would be incidents in which a management team reviewed the circumstances of an incident and then assigned one or more remediation actions to mitigate reoccurrence of the incident. A second incident dataset may include one or more incidents that were not reviewed by a management team and not assigned at least one remediation action. These may be incidents in which the severity level of the incident did not satisfy a threshold to warrant having a management team review the incident. In some cases, this may still be an incident that greatly affects an entity; however, due to time commitments for the management team individuals, resources, and/or expenses, such an incident merely cannot be reviewed quickly or ever to attempt to ensure that reoccurrence of the incident does not happen again. Thereafter the method moves to step 406. As shown in FIG. 4A, an alternative process may have the method first move to the steps in FIG. 5 prior to moving to step 406 as described below.

Moving to step 406, the second incident dataset may be inputted into a first machine learning matching model trained to semantically match one or more first descriptions of the one or more incidents in the first incident dataset with a second description of a first incident in the second incident dataset. The first machine learning matching model may operate on one or more computing devices, such as the one or more computing devices in FIGS. 2 and 3. For a single incident in the second dataset, step 406 may be implemented by matching each description of the particular incident to the various descriptions associated with incidents in the first dataset. As described in an earlier example, a description for an incident in the second dataset of "broken fan" may be matched with a description for an incident in the first dataset of "fan failure" due to the similarity of the descriptions. As described herein, the historical incident data that is used to compile the two datasets may be added to, deleted, and/or otherwise modified over time.

In step 408, the first machine learning matching model may be trained to recognize one or more relationships between the two datasets. Specifically, the first machine learning matching model may semantically match descriptions of the incidents in the first incident dataset with a description of an incident in the second incident dataset. Step 408 may further be performed for each description within the second dataset. In some embodiments, the first machine learning matching model may semantically match the first dataset incident descriptions with the second dataset incident descriptions by utilizing a text similarity algorithm. The text similarity algorithm may be part of natural language processing where a description of a particular incident in the first dataset is a text entry describing a cause of the particular incident. In other embodiments, semantic matching may be performed on one of or more than one of the following: words or paragraphs from other textual data fields, named entity recognition terms, specific parts of speech such as proper nouns or verbs, ranked phrases, or other combination of terms from fields in step 402.

Proceeding to step 410, the first machine learning matching model may output a score representative of a similarity of a description within the first dataset and a description within the second dataset. Step 410 may be implemented for each description within the second dataset. A score may be a numerical value associated with a designated scale with a higher value corresponding to higher similarity determination for the two descriptions. This score may be one of or an arithmetic function of more than one of any semantic matching possibilities from step 408, text frequency, pattern similarities, or any combination of the above. The one or more computing devices implementing step 410 may be one or more of the same computing devices described in FIGS. 2 and 3.

In step 412, for each score associated with a description in the first dataset to a description in the second dataset, a determination may be made as to whether the score satisfies a threshold. For example, a threshold score for similarity may require a score of 75 on a scale of 0 to 100 to qualify as a threshold score. Accordingly, a score with a threshold of 75 or higher may be determined to satisfy the threshold before proceeding to step 414. In addition, that score that satisfies the threshold in step 412 is also utilized as part of step 416. Alternatively, a score that fails to satisfy the threshold, such as a score of 74 or below in the above example, may be determined to fail to satisfy the threshold before proceeding to step 414.

In step 414, one or more computing device may map one or more remediation actions based upon the one or more scores found to satisfy a threshold value in 412. The one or more computing devices maybe the one or more computing devices in FIGS. 2 and 3. The mapping in step 418 may include ranking the mapped remediation actions by the scores. In some embodiments, this will be a list of the mapped, and potentially ranked, remediation actions that should be evaluated for use in mitigating reoccurrence of an incident not reviewed in the second dataset.

Moving to FIG. 4B, in step 420, the mapped one of the at least one remediation action may be provided. In some embodiments this may be a list of remediation actions, that may be ranked from step 418, that the system provides to an individual for most similar or suggested remediation actions that may be taken to mitigate reoccurrence of the incident under evaluation in the second dataset. Although the incident under evaluation in the second dataset already was restored, since the incident was never reviewed by a management team to evaluate the circumstances of how and why it occurred and measure that may be taken to ensure that reoccurrence of that incident does not happen again, such an incident may occur once again.

Moving to step 422, a user input representative of a confirmation of assigning the mapped remediation action(s) to the incident in the second dataset being evaluated may be received. Step 422 may include a determination as to whether the mapped one remediation action(s) are assigned to such an incident. An individual may accept or reject any particular mapped remediation action before proceeding to step 424. In alternative embodiments, no user confirmation to assign the one or more mapped remediation actions to the incident being evaluated may be received. This may be a situation in the which the system operates autonomously and merely assigned any mapped remediation actions automatically without user confirmation before proceeding to step 424.

In step 424, a new database entry in the historical incident data may be created. The new entry may include the automatically mapped or the confirmed remediation action(s) and the incident in the second dataset being evaluated. Accordingly, the historical incident data now has been updated to account for any assigned remediation actions being provided for the incident in the second dataset being evaluated. Again, this process may occur separately or concurrently for each incident in the second dataset.

Proceeding to step 426, one or more computing device may receive input to assign one or more additional remediation actions to the incident in the second dataset being evaluated. An individual may identify additional remediation actions to assign to the incident in the second dataset being evaluated. For example, after reviewing the provided list of remediation actions mapped and potentially ranked, an individual that may be responsible for the device and/or system affected by the incident in the second dataset being evaluated may determine that an additional remediation action, not included among those that were included in the provided list, should be assigned to the incident in the second dataset being evaluated.

In step 428, the assigned remediation actions that were mapped, accepted, and or added, are performed with respect to the incident in the second dataset being evaluated. Once again, this step may be performed with respect to each incident in the second dataset. Moving to step 430, data regarding the incident in the second dataset may be updated to have data of the incident now added into the first incident dataset and at the same time removed from the second incident dataset since evaluation of the incident has been completed. This data may be maintained in the historical incident data. Now the next time the historical incident data is used any evaluated incidents, previously in the second dataset, may be used as part of the first dataset in evaluating remaining incidents in the second dataset. In a future instance, the first machine learning matching model may learn how a previous identification of remediation actions to map to an incident was changed and/or confirmed by a user and may apply the same when a similar incident for evaluation occurs in the future.

Figure 5:
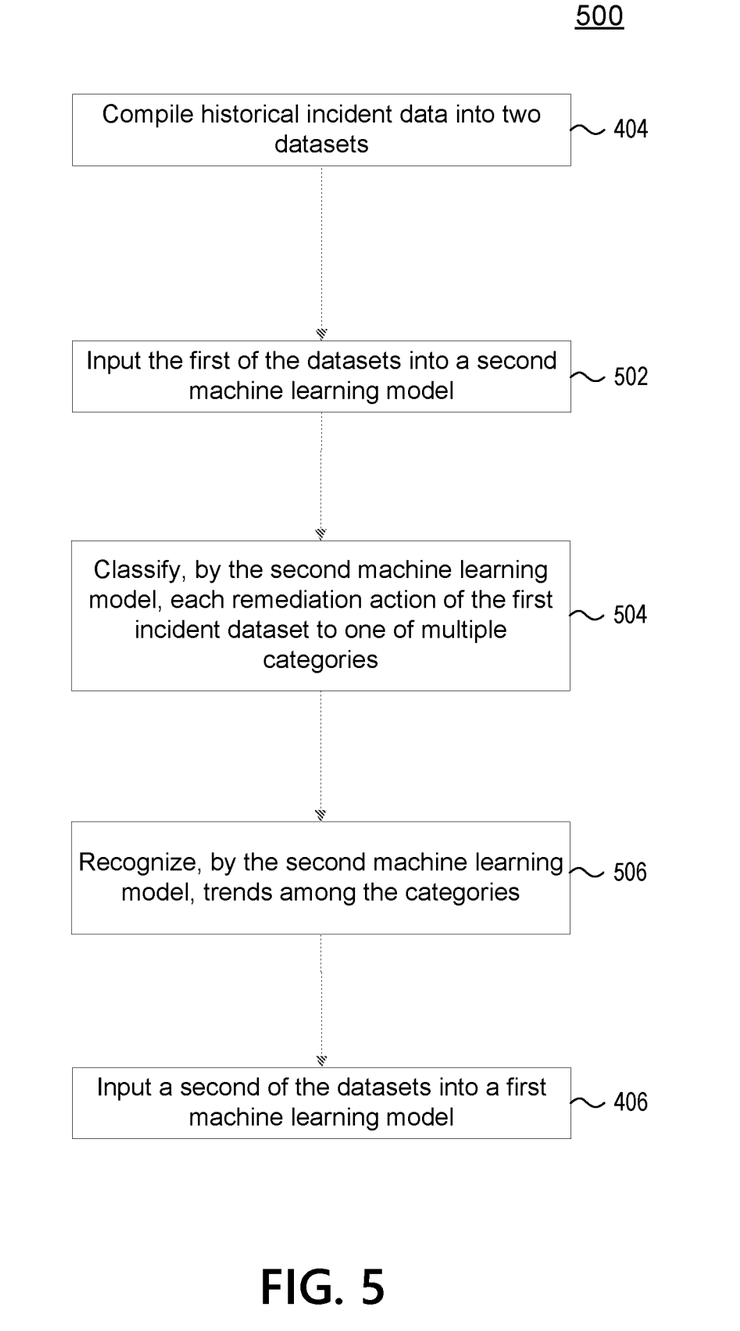
FIG. 5 depicts a flowchart for a method for classifying remediation actions assigned for previously reviewed incidents into categories and recognizing trends among the categories for use in mitigating the reoccurrence of a previous incident of an entity in accordance with one or more aspects described herein.

FIG. 5 depicts a flowchart for a method for classifying remediation actions assigned for previously reviewed incidents into categories and recognizing trends among the categories for use in mitigating the reoccurrence of a previous incident of an entity. As shown in FIG. 4A, FIG. 5 may be an alternative process that is implemented between steps 404 and 406. Proceeding from step 404 as described herein, the process moves to step 502 where the first incident dataset may be inputted into a second machine learning trend identification model trained to classify each remediation action of the first incident dataset to one of a plurality of categories. The second machine learning matching model may operate on one or more computing devices, such as the one or more computing devices in FIGS. 2 and 3. In step 502, the second machine learning trend identification model may perform the necessary steps to classify each remediation action of the first incident dataset to one of a plurality of categories. As part of this process, applicable categories for classification purposes may be created and/or identified. In addition, different categories for different types of parameters of data for an incident may be created and/or identified. For example, a first parameter may be categories for entity identified severity levels, such as five categories corresponding to a predetermined scale of 1 to 5, with 5 being the most severe level, and another parameter may be categories for time range of incident, such as four categories corresponding to a predetermined time range of 12 am to 6 am, 6 am to 12 pm, 12 pm to 6 pm, and 6 pm to 12 am. Accordingly, the classification step of 504 may be implemented with a remediation action being categorized into one category for each of a plurality of parameters.

In step 506, the second machine learning trend identification model further may recognize trends among the categories. The second machine learning trend identification model may recognize the trends by identifying a ratio between classified remediation actions and a first category of the plurality of categories. The second machine learning trend identification model also may recognize the trends by identifying whether a first category of the plurality of categories includes more classified remediation actions than a second category of the plurality of categories. In some embodiments, the second machine learning trend identification model may recognize the trends by identifying whether a first category of the plurality of categories includes more classified remediation actions than each of the other of the plurality of categories based upon a time of year.

In other embodiments, one or more trends may be determined around similar incidents occurring despite the mitigation with remediation actions. This may include the same semantic analysis as described herein, but the analysis includes analysis of all historical incident data, regardless of being in a first or a second dataset. In such embodiments, the threshold for the score may be higher. In yet other embodiments, such a semantic analysis of both first and second datasets also may include other fields as part of the analysis, such as a root cause of the incident.

One or more steps of the example may be rearranged, omitted, and/or otherwise modified, and/or other steps may be added.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    compiling, by a first computing device, historical incident data maintained in a database, the historical incident data representative of data of assets of an entity previously involved in one or more incidents, into:
        a first incident dataset representative of the one or more incidents that were assigned at least one remediation action, wherein each remediation action was assigned to mitigate reoccurrence of a corresponding incident, and
        a second incident dataset representative of the one or more incidents that were not assigned at least one remediation action; and
    inputting the first incident dataset into a first machine learning model trained to:
        classify, based on the first incident dataset, each of the one or more incidents into different categories; and
        determine, based on the classification, at least one trend between the different categories;
    inputting the second incident dataset into a second machine learning model trained to:
        output, based on semantically matching, at least based on the classification and based on determining the at least one trend, one or more first descriptions of the one or more incidents in the first incident dataset with a second description of a first incident in the second incident dataset by utilizing at least one text similarity algorithm, a score representative of a similarity of the one or more first descriptions and the second description; and
    causing, based on the score representative of a similarity of the one or more first descriptions and the second description, performance of the at least one remediation action associated with the one or more incidents of the first incident dataset.

2. The method of claim 1, further comprising receiving the historical incident data.

3. The method of claim 1, wherein the one or more first descriptions of the one or more incidents in the first incident dataset is a text entry describing a cause of the one or more incidents.

4. The method of claim 1, wherein the one or more first descriptions are words from a textual data field of the first incident dataset.

5. The method of claim 1, wherein the one or more first descriptions is one or more named entity recognition terms in the first incident dataset.

6. The method of claim 1, wherein the one or more first descriptions is a part of speech of a textual data field of the first incident dataset.

7. The method of claim 1, wherein the second machine learning model is further trained to semantically match the one or more first descriptions of the one or more incidents in the first incident dataset with a second description of a first incident in the second incident dataset by utilizing at least one text similarity algorithm.

8. The method of claim 1, further comprising mapping, based on the score for each of the one or more first descriptions, one of the at least one remediation action to the first incident.

9. The method of claim 8, further comprising providing the mapped one of the at least one remediation action.

10. The method of claim 9, wherein performance of the at least one remediation action further comprises the mapped one of the at least one remediation action.

11. The method of claim 10, further comprising, after the mapping, determining whether a new remediation action is assigned to the first incident.

12. The method of claim 1, further comprising adding data of the first incident into the first incident dataset and removing data of the first incident from the second incident dataset.

13. One or more non-transitory media storing instructions that, when executed by one or more processors, cause the one or more processors to:
    compile historical incident data maintained in a database, the historical incident data representative of data of assets of an entity previously involved in one or more incidents, into:
        a first incident dataset representative of the one or more incidents that were assigned at least one remediation action, wherein each remediation action was assigned to mitigate reoccurrence of a corresponding incident, and
        a second incident dataset representative of the one or more incidents that were not assigned at least one remediation action; and
    input the first incident dataset into a first machine learning model trained to:
        classify, based on the first incident dataset, each of the one or more incidents into different categories; and determine, based on the classification, at least one trend between the different categories;

input the second incident dataset into a second machine learning model trained to:

output, based on semantically matching, at least based on the classification and based on determining at least one trend, one or more first descriptions of the one or more incidents in the first incident dataset with a second description of a first incident in the second incident dataset by utilizing at least one text similarity algorithm, a score representative of a similarity of the one or more first descriptions and the second description; and cause, based on the score representative of a similarity of the one or more first descriptions and the second description, performance of the at least one remediation action associated with the one or more incidents of the first incident dataset.

14. The one or more non-transitory media storing instructions of claim 13, wherein the second machine learning model is further trained to semantically match the one or more first descriptions of the one or more incidents in the first incident dataset with a second description of a first incident in the second incident dataset by utilizing at least one text similarity algorithm.

15. The one or more non-transitory media storing instructions of claim 13, that, when executed by the one or more processors, further cause the one or more processors to map, based on the score for each of the one or more first descriptions, one of the at least one remediation action to the first incident.

16. The one or more non-transitory media storing instructions of claim 15, that, when executed by the one or more processors, further cause the one or more processors to provide the mapped one of the at least one remediation action.

17. The one or more non-transitory media storing instructions of claim 16, wherein performance of the at least one remediation action further comprises the mapped one of the at least one remediation action associated with the one or more incidents of the first incident dataset.

18. The one or more non-transitory media storing instructions of claim 13, that, when executed by the one or more processors, further cause the one or more processors to add data of the first incident into the first incident dataset and removing data of the first incident from the second incident dataset.

19. The one or more non-transitory media storing instructions of claim 13, wherein the one or more first descriptions of the one or more incidents in the first incident dataset is a text entry describing a cause of the one or more incidents.

20. A computing device, comprising:

at least one processor; and memory storing computer-readable instructions that, when executed by the at least one processor, cause the computing device to:

compile historical incident data maintained in a database, the historical incident data representative of data of assets of an entity previously involved in one or more incidents, into:

a first incident dataset representative of the one or more incidents that were assigned at least one remediation action, wherein each remediation action was assigned to mitigate reoccurrence of a corresponding incident, and a second incident dataset representative of the one or more incidents that were not assigned at least one remediation action; and input the first incident dataset into a first machine learning model trained to:

classify, based on the first incident dataset, each of the one or more incidents into different categories; and determine, based on the classification, at least one trend between the different categories;

input the second incident dataset into a second machine learning model trained to:

output, based on semantically matching, at least based on the classification and based on determining at least one trend, one or more first descriptions of the one or more incidents in the first incident dataset with a second description of a first incident in the second incident dataset by utilizing at least one text similarity algorithm, a score representative of a similarity of the one or more first descriptions and the second description; and cause, based on the score representative of a similarity of the one or more first descriptions and the second description, performance of the at least one remediation action associated with the one or more incidents of the first incident dataset.

* * * * *